Aug. 18, 1942.　　O. LIEBMANN ET AL　　2,293,438
COMBINED RANGE AND VIEW FINDER
Filed Jan. 9, 1940　　2 Sheets-Sheet 1
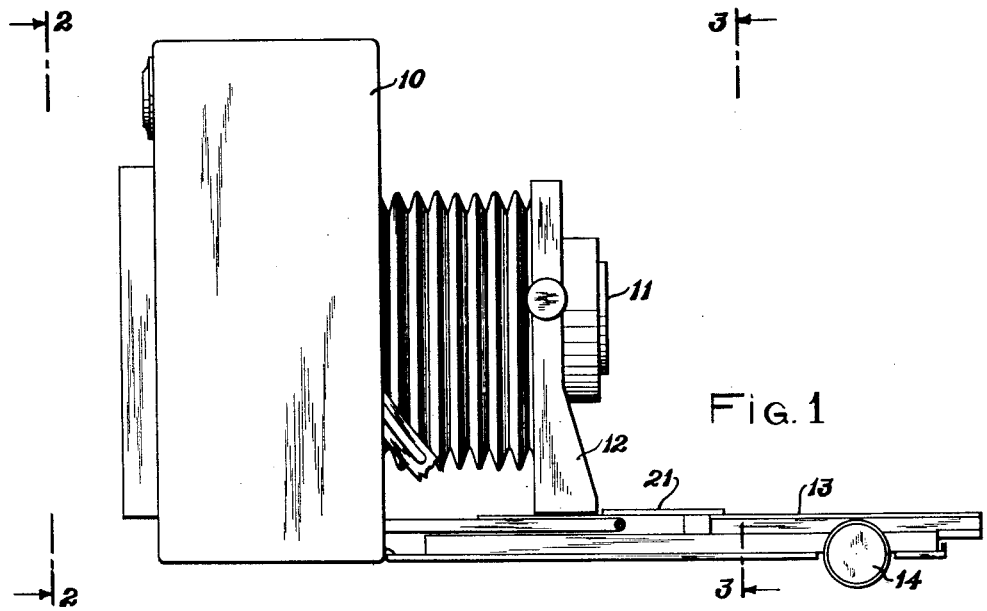
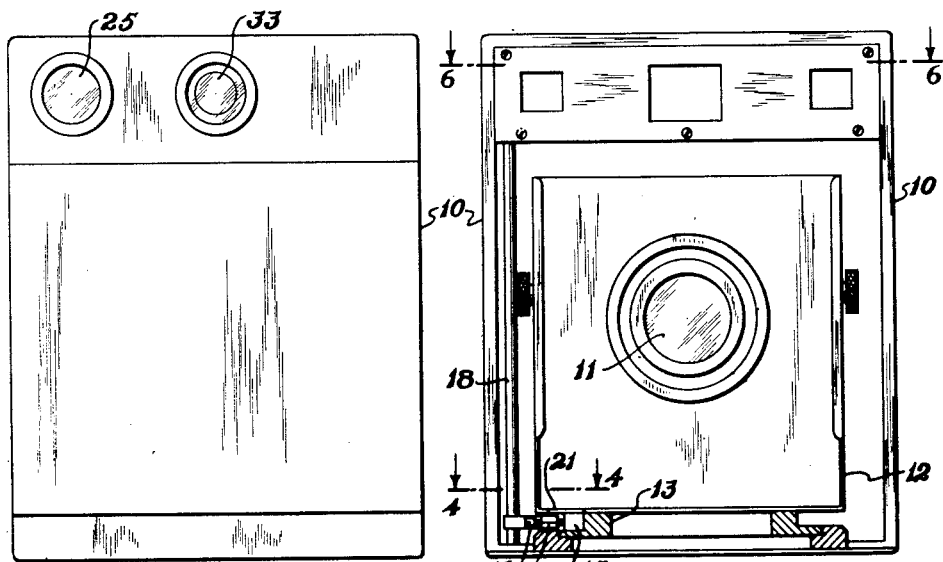
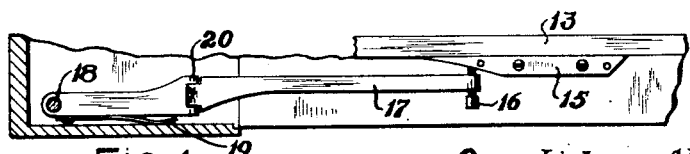
INVENTORS.
Oscar Liebmann & Ignaz Suwa.
BY Peter M. Boesen.
ATTORNEY.

Aug. 18, 1942.   O. LIEBMANN ET AL   2,293,438
COMBINED RANGE AND VIEW FINDER
Filed Jan. 9, 1940    2 Sheets-Sheet 2
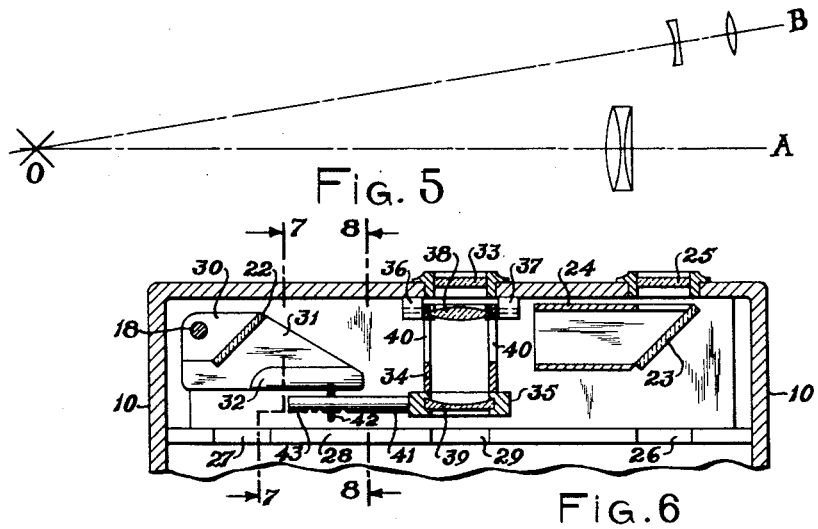
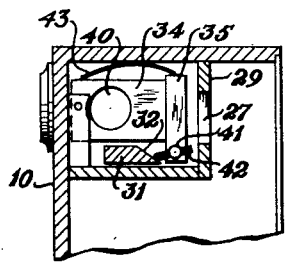 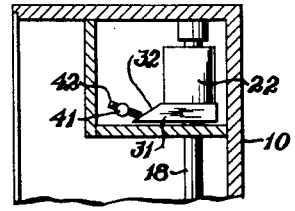
INVENTORS
Oscar Liebmann & Ignaz Suwa.
BY
ATTORNEY.

Patented Aug. 18, 1942

2,293,438

UNITED STATES PATENT OFFICE 2,293,438

COMBINED RANGE AND VIEW FINDER

Oscar Liebmann, Bergenfield, N. J., and Ignaz Suwa, Jackson Heights, N. Y., assignors to Q. O. S. Corporation, New York, N. Y., a corporation of New York Application January 9, 1940, Serial No. 313,144

5 Claims. (Cl. 95—44)

This invention relates to improvements in coupled range finders for cameras in combination with view finders for same and particularly to the operating mechanism which actuates the movable mirror of the range finder and simultaneously corrects the view finder for parallax.

An important object of this invention is to provide a range finder of the rotatable mirror type which has coupled to it a view finder with automatic correction of parallax.

A further object of the invention is to provide a combined range and view finder conveniently arranged in one case and with their optical axes automatically adjustable by the same means.

Other objects of the invention are to provide a combined range and view finder which can be manufactured at low cost, which can be easily calibrated, and which is simple and accurate in operation.

Other objects and advantages of the invention will be apparent during the course of the following description.

In the accompanying drawings, forming a part of this specification, and in which like numerals are employed to designate like parts throughout the same, Figure 1 is a side elevation of a camera equipped with a preferred embodiment of the invention, Figure 2 is a rear elevation along line 2—2 in Figure 1, Figure 3 is a front elevation along line 3—3 in Figure 1, Figure 4 is a sectional plan view along line 4—4 in Figure 3, Figure 5 is a schematic diagram showing the relation of the optical axes of the camera and the view finder, Figure 6 is a sectional plan view along line 6—6 in Figure 3, Figure 7 is a section along line 7—7 in Fig. 6, and Figure 8 is a section along line 8—8 in Fig. 6.

Referring to the drawings, the numeral 10 designates the camera housing with the lens 11 and the lens carrier 12 and the extension slide rails 13, which can be adjusted with the knurled knobs 14. To one of the slides 13 is fastened a cam 15 against which rides the screw 16 held in the end of the hinged spring loaded lever 17. The lever 17 is fastened at its other end to the vertical shaft 18 and is pressed against cam 15 by the spring 19, see Fig. 4. The hinge 20 permits closing of the camera. A cover plate 21 is fastened over cam 15 and extends outside same so as to prevent lever 17 from going out of engagement with cam 15, see Figures 1 and 3.

The vertical shaft 18 extends upward along the rear wall of the camera case 10 and is journalled in same at both ends. The upper end of shaft 18 extends into the combined range and view finder which is located in a separate compartment extending transversely across the inside and upper rear part of the case 10. Inside the said space is mounted the rotatable mirror 22 which is fastened to and operable by the shaft 18. A corresponding semi-transparent mirror 23 is mounted in optical relationship to the mirror 22 at the other end of the range finder space. The mirror 23 is mounted to a square tubing 24. An observation window 25 in the rear of case 10 is in line with mirror 23 and permits observation of the reflected view from mirror 22 as well as the view which may be observed directly through mirror 23 and window 26. A similar window 27 is located in the front wall 28 of the range finder case which also has a window 29 for the view finder. These windows may have either ordinary glass or lenses, as desired.

The mirror 22 is mounted on a block 30 at the base of which is fastened a cam 31 which on one side has a slanting edge 32. The view finder is mounted in the center of the camera and has an observation window 33 in the rear of case 10. A square tubing 34 with the heavy flange 35 is hinged at one end in the lugs 36 and 37, the front end 35 being movable up and down in a vertical direction. At the rear end, the square tubing 34 carries a convex lens 38 and at the front end it carries a concave lens 39. The tube 34 has transverse openings 40 through which the image from mirror 22 may pass to mirror 23. At the base of flange 34 is fastened the rod 41 which extends horizontally away from same and which carries the set screw 42. This bar 41 has a plurality of holes 43 in which screw 42 may be placed. The screw 42 is placed at a slight angle with the horizontal as shown in Fig. 7. A spring 43 holds the square tubing and the lever 41 down against cam 31.

The operation of the invention is as follows:

In focusing the camera in the usual way by turning the knob 14, the end of the screw 16 is sliding along the curved surface of cam 15 and will thus give a slight rotational movement of the vertical shaft 18 thereby turning the mirror 22. By observing through window 25, the knob 14 may be turned until coincidence is obtained at which time the camera is focused for the correct distance. At the same time the mirror 22 is turning, the cam 31 will also turn and the end of screw 42 will be moved in a vertical direction by the slanting surface 32. The hinged view finder will thus make a corresponding vertical motion which is calibrated in such a way that the optical axis of the view finder will cross the optical axis of the camera at the point of the object when the camera is focused for the object. The calibration of the view finder is made both by turning screw 42 and by moving same to another hole in the bar 41, if necessary. The relation of the optical axes to the camera and the view finder is shown in Figure 5 where the line OA represents the optical axis of the camera and the line OB represents the optical axis of the view finder. By means of the mechanically coupled range finder the two axes OA and OB are automatically brought to intersect at the point O.

Modification may be resorted to without departing from the spirit of the invention or the scope of the appended claims.

What is claimed is:

1. A combined range and view finder of the character described, comprising in combination a folding camera having an extension slide for focusing the objective lens, a curved cam fastened to the extension slide of said camera; a vertical shaft journalled at both ends in the rear of the camera case; a spring loaded lever fastened to the lower end of said shaft and having its outer part in operable engagement with said cam, the outer part of said lever being hingedly connected with the inner part which is fixed to the shaft to permit the lever to fold with the camera; a rotatable reflector fastened to said shaft; a semi-transparent reflector located in optical relationship to said rotatable reflector; a view finder located between said fixed and rotatable reflectors, said view finder comprising a tubular housing, a plurality of lenses mounted in said tubular housing, said tubular housing being hinged at one end and having a transverse opening along the optical axis between said rotatable reflector and said semi-transparent reflector; a cam fastened to said vertical shaft, and adjustable means fastened to the free end of said view finder and being in operable engagement with said cam whereby said view finder is automatically adjusted for parallax.

2. A combined range and view finder of the character described, comprising in combination a folding camera having an extension slide for focusing the objective lens, a curved cam fastened to the extension slide of said camera; a vertical shaft journalled at both ends in the rear of the camera case; a spring loaded lever fastened to the lower end of said shaft and having its outer part in operable engagement with said cam, the outer part of said lever being hingedly connected with the inner part which is fixed to the shaft to permit the lever to fold with the camera; a rotatable reflector fastened to said shaft; a semi-transparent reflector located in optical relationship to said rotatable reflector; a view finder located between said fixed and rotatable reflectors, said view finder comprising a tubular housing, a lens objective mounted in said tubular housing, said tubular housing being hinged at its rear end and having a transverse opening along the optical axis between said rotatable reflector and said semi-transparent reflector; a cam fastened to said vertical shaft; a lever extending from the free end of the view finder, and adjustable means fastened to said lever and being in operable engagement with said cam whereby the view finder is automatically adjusted for parallax.

3. A combined range and view finder of the character described, comprising in combination a folding camera having an extension slide for focusing the objective lens, a curved cam fastened to the extension slide of said camera; a vertical shaft journalled at both ends in the rear of the camera case; a spring loaded lever fastened to the lower end of said shaft and having its outer part in operable engagement with said cam, the outer part of said lever being hingedly connected with the inner part which is fixed to the shaft to permit the lever to fold with the camera; a rotatable reflector fastened to said shaft; a semi-transparent reflector located in optical relationship to said rotatable reflector; a view finder comprising a lens structure, a square tubing housing same lens structure, said square tubing being hinged at one end and being spring actuated in one direction, the square tubing being located between the fixed and rotatable reflector and having transverse openings permitting light to pass from one of said reflectors to the other; a lever being fastened to the free front end of said view finder, a knife shaped cam being fastened to said vertical shaft adjacent to the rotatable reflector, and screw adjustment means fastened to said view finder lever and in operable engagement with said rotatable knife shaped cam.

4. A combined range and view finder of the character described, comprising in combination a folding camera having an extension slide for focusing the objective lens; a curved cam fastened to the extension slide of said camera; a vertical shaft journalled at both ends in the rear of the camera case; a spring loaded lever fastened to the lower end of said shaft and having its outer part in operable engagement with said cam; the outer part of said lever being hingedly connected with the inner part which is fixed to the shaft to permit the lever to fold with the camera; a rotatable reflector fastened to said shaft; a semi-transparent reflector located in optical relationship to said rotatable reflector, said semi-transparent reflector being located near one side of the camera while said rotatable reflector is located near the opposite side; a view finder comprising a plurality of lenses, a square tubing housing said lenses, said square tubing being pivoted to the camera at one end and being spring actuated in the vertical direction, said square tubing being located in the vertical center line of the camera between the fixed and rotatable reflectors and having a transverse opening permitting light to pass from one of said reflectors to the other; a lever being fastened to the free end of said view finder; a knife shaped cam rigidly fastened to said vertical shaft adjacent to the rotatable reflector, and screw adjustable means fastened to said view finder lever and in operable engagement with said rotatable knife shaped cam.

5. A combined range and view finder of the character described, comprising in combination a folding camera having an extension slide for focusing the objective lens; a curved cam fastened to the extension slide of the camera; a vertical shaft journalled at both ends in the rear of the camera case; a spring loaded lever fastened to the lower end of said shaft and having its outer part in operable engagement with said cam, the outer part of said lever being hingedly connected with the inner part which is fixed to the shaft to permit the lever to fold with the camera; a rotatable reflector fastened to said shaft; a semi-transparent reflector located in optical relationship to said rotatable reflector, said semi-transparent reflector being located near one side of the camera while said rotatable reflector is located near the opposite side; a view finder comprising a telescopic lense arrangement, a square tubing forming the mounting for said telescopic arrangement, said square tubing being pivoted to the camera at its rear end, the front end being free to move vertically in one direction and being spring loaded in the downward vertical sense, said square tubing being located in the vertical center line of the camera between the fixed and rotatable reflector and having a transverse opening permitting light to pass from one of said reflectors to the other; a lever being fastened to the free end of said view finder tubing; a knife shaped cam being rigidly and rotatably mounted on said vertical shaft below said rotatable reflector and screw adjustable means fastened to said view finder lever whereby same is brought into operable engagement with said rotatable knife shaped cam.

OSCAR LIEBMANN.
IGNAZ SUWA.